United States Patent [19]
Rymer

[11] Patent Number: 5,458,089
[45] Date of Patent: Oct. 17, 1995

[54] PET COMMODE ASSEMBLY HAVING RETRACTABLE SHELVES RESPONSIVE TO WEIGHT OF HUMAN ON TOILET SEAT

[76] Inventor: Jon K. Rymer, 2856 Dalewood Pl., Norman, Okla. 73071

[21] Appl. No.: 212,204

[22] Filed: Mar. 11, 1994

[51] Int. Cl.[6] .................................................. A01K 29/00
[52] U.S. Cl. ....................... 119/162; 4/246.2; 4/239
[58] Field of Search ............................. 119/162, 163, 119/165; 4/235, 238, 239, 246.2, 330, 338, 485, 486

[56] References Cited

U.S. PATENT DOCUMENTS

| | | | |
|---|---|---|---|
| 1,064,148 | 6/1913 | Lehtonen | 4/238 |
| 2,266,641 | 12/1941 | Joyce et al. | 4/235 |
| 2,676,331 | 4/1954 | Inman | 4/239 |
| 3,601,093 | 8/1971 | Cohen . | |
| 3,603,290 | 9/1971 | Rork . | |
| 3,656,457 | 4/1972 | Houston | 119/162 |
| 3,688,742 | 9/1972 | McGee | 119/162 |
| 3,757,738 | 9/1973 | Hall . | |
| 3,949,429 | 4/1976 | Hall | 4/10 |
| 4,054,958 | 10/1977 | Widham | 4/238 |
| 4,153,957 | 5/1979 | Lifton | 4/239 |
| 4,181,096 | 1/1980 | Grubman . | |
| 4,181,988 | 1/1980 | Skaggs | 4/235 |
| 4,228,554 | 10/1980 | Tumminaro . | |
| 4,231,321 | 11/1980 | Cohen . | |
| 4,262,634 | 4/1981 | Piccone . | |
| 4,271,544 | 6/1981 | Hammond | 4/661 |
| 4,437,430 | 3/1984 | DeBardeleben . | |
| 5,029,347 | 7/1991 | Lin | 4/246.2 |
| 5,103,772 | 4/1992 | Schmid | 119/162 |

*Primary Examiner*—Todd E. Manahan
*Attorney, Agent, or Firm*—Bill D. McCarthy; Phillip L. Free, Jr.

[57] ABSTRACT

A toilet seat device and associated training method for pet animals that permit dual purpose use of a household toilet by both humans and pets, the toilet seat device comprising a toilet seat supported by a commode and having a plurality of retractable shelf segments which are biased inward to reduce the central aperture of the toilet seat. The shelf segments are extended and retracted radially by fluid pressurization and are actuated to retract when the weight of a human is supported on the toilet seat.

19 Claims, 7 Drawing Sheets

PET COMMODE ASSEMBLY HAVING RETRACTABLE SHELVES RESPONSIVE TO WEIGHT OF HUMAN ON TOILET SEAT

BACKGROUND OF THE INVENTION

1. Field of the Invention

The present invention relates to the field of domestic pet animal care, and more particularly but not by way of limitation, to a commode assembly for the training and care of domestic pet animals.

2. Discussion of the Prior Art

Pet animals are nurtured, maintained and loved by countless millions of people in this country and abroad. Since society at large places an inestimable value on life, including that of animals, it is not surprising that domesticated pet animals often have the status of near family and receive care and keeping approaching that of humans.

A necessity that must be attended in the care of domesticated pet animals is that of toilet facilities where such pets are kept indoors for extended periods of time. To this end, numerous prior art patents have been directed toward the adaption or conversion of ordinary toilet facilities for the use of pet animals.

One approach is the permanent toilet structure taught in U.S. Pat. No. 4,228,554, issued to Tumminaro. Another approach is the use of a device that attaches to a conventional household toilet, but must be removed for human use of the toilet. Devices of this type are taught in U.S. Pat. No. 4,437,430 issued to DeBardeleben; U.S. Pat. No. 4,271,544 issued to Hammond; U.S. Pat. No. 4,231,321 issued to Cohen; U.S. Pat. No. 3,688,744 issued to McGee; U.S. Pat. No. 3,656,457 issued to Houston; and U.S. Pat. No. 4,181,096 issued to Grubman. Still another approach is a device that attaches to a household toilet and does not require removal for human use of the toilet. Devices of this type are taught in U.S. Pat. No. 5,103,772 issued to Schmid; U.S. Pat. No. 4,262,634 issued to Piccone; U.S. Pat. No. 3,757,738 issued to Hall; U.S. Pat. No. 3,949,429 issued to Hall; and U.S. Pat. No. 3,603,290 issued to O'Rork.

Certainly a toilet mounted device offers the benefits of less expense and more convenience than a permanent structure device. However, prior art teachings of toilet mounted devices require the human user of the toilet to either manually manipulate the device, or to tolerate an obstruction in the toilet. There is a need for a device that converts a commode which is alternately profiled to be available for use by a pet upon demand, and which automatically reverts to a profile required for human use.

SUMMARY OF THE INVENTION

The present invention provides a commode assembly having a toilet bowl in fluid communication with a drain. A water closet is provided for storing a flushing fluid, usually water, for flushing the toilet bowl upon demand, and a toilet seat assembly, supported on the toilet bowl, provides a variable sized central aperture or opening which accommodates human usage of the commode assembly in one mode, and accommodates a pet animal usage in another mode.

More specifically, the toilet seat assembly, which can be mounted for support on a conventional toilet bowl, has a rim member which forms the central aperture or opening to the toilet bowl, and further, has a plurality of shelf segments which protract to partially close the central aperture and which retract to open the central aperture. In the protracted mode, the shelf segments form a platform capable of supporting a pet animal for toilet use; while in the retracted mode, the shelf segments are disposed to permit human usage of the toilet.

A cushion member, supported on the rim member, communicates pressure in response to the weight of a human to position the shelf segments in the retracted mode via a cylinder and leg assembly that positions the shelf segments in the protracted mode when the human weight is no longer detected.

An object of the present invention is to provide a commode assembly which automatically adjusts to provide toilet accommodations for pet animal and human users.

Another object of the present invention, while achieving the above stated object, is to provide automatic manipulation of a toilet device that provides unobstructed normal use of a household toilet which is dedicated to the use thereof by a domestic pet animal.

A further object of the present invention, while achieving the above stated objects, is to provide a commode assembly which converts a conventional toilet bowl to automatically accommodate both human and pet animal usage.

Yet another object of the present invention, while achieving the above stated objects, is to provide a commode assembly which automatically accommodates both human and pet animal usage while retaining the appearance of a conventional commode assembly.

One further object of the present invention, while achieving the above stated objects, is to provide a dual mode commode assembly for both human and pet animal users which readily affords pet animal training devices and methods.

Another object of the present invention, while achieving the above stated objects, is to provide a dual mode commode assembly accommodating both human and pet animal users and which is economical to manufacture, operate and maintain.

Other objects, features and advantages of the present invention will become apparent from the following description when read in conjunction with the drawings and appended claims.

BRIEF DESCRIPTION OF THE DRAWINGS

FIG. 5 is a sectional view in elevation along the line 5—5 in FIG. 3.

FIG. 6 shows the extend and twist locking action of the leg members of fluid cylinder members of the cylinder and leg assembly of FIG. 4.

DESCRIPTION

Figure 1:
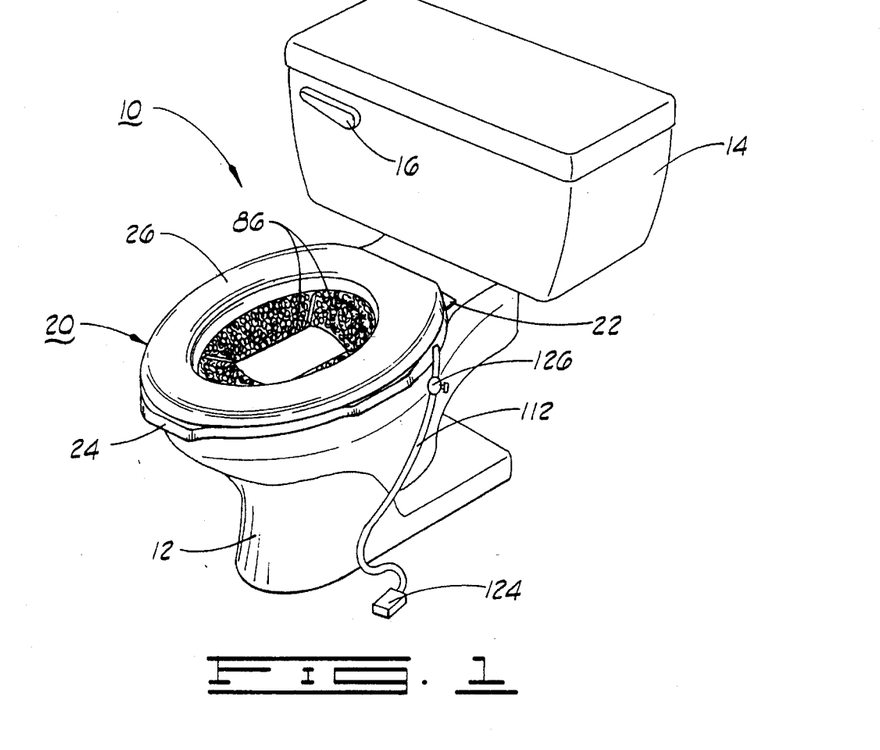
FIG. 1 is a perspective view of a commode assembly constructed in accordance with the present invention.

Referring to the drawings in general, and to FIG. 1 specifically, shown therein is a commode assembly 10 which is constructed in accordance with the present invention. The commode assembly 10 has a toilet bowl 12 and a water closet 14 connected thereto in a conventional manner. The water closet 14 has a flushing lever 16 and contains conventional internal structure (not shown) that, connected to a water supply, provides flushing water to the toilet bowl 12 upon depressing the flushing lever 16. These portions of the commode assembly 10 are conventional and need not be described further herein.

The commode assembly 10 has a toilet seat assembly 20 that is supported on the toilet bowl 12 as shown in FIG. 1. The toilet seat assembly 20 can be attached to the toilet bowl 12 by a connector 22. The connector 22 can be a conventional hinge connector having bolts (not shown) which extend through appropriately located apertures in the toilet bowl 12 in a conventional manner so that the toilet seat assembly 20 will fit common mounting apertures without modification. Alternatively, the connector 22 can be in the form of a permanent member bolted to the toilet bowl via bolts through the bowl apertures, and a pivot mechanism extending from the toilet seat assembly 20 which snaps onto the permanent member. This alternative structure provides for quick removal of the toilet seat assembly 20 for the purpose discussed below.

Figure 2:
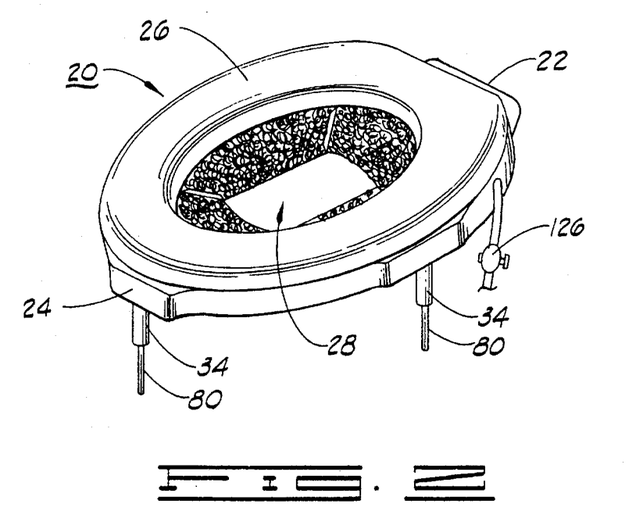
FIG. 2 is a perspective view of the toilet seat assembly of FIG. 1 removed from the toilet bowl and set on a floor surface.
Figure 3:
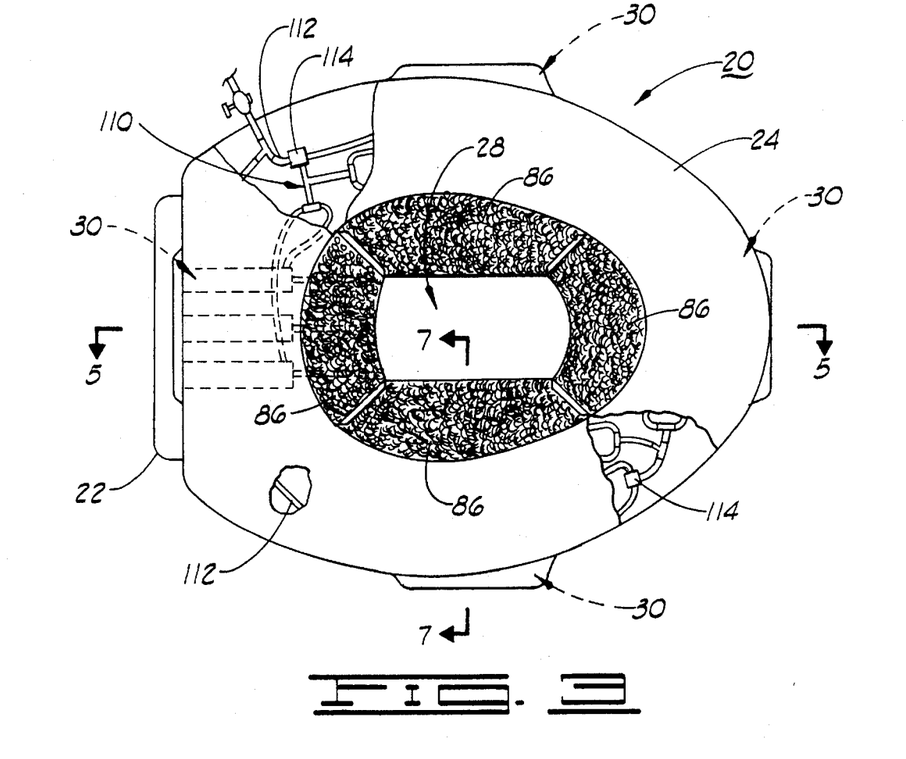
FIG. 3 is a top plan view of the toilet seat assembly of FIG. 2 with portions of the rim member thereof broken away for viewing internal structures thereof.

As shown in FIGS. 1 through 3, the outward appearance of the toilet seat assembly 20 resembles a common toilet seat, consisting of an oval ring shaped rim member 24 and a cushion 26, the rim member 24 forming a central aperture or opening 28 above the toilet bowl 12. Installed on the toilet bowl 12, the toilet seat assembly 20 forms an integral part of the commode assembly 10, and the toilet seat assembly 20 supports either a human user of the commode assembly 10 or a pet animal in the manner discussed hereinbelow for eliminating through the aperture 28 into the toilet bowl 12. A cover member (not shown) can be provided if desired for closing the aperture or opening 28, but such closure must keep open the aperture 28 when the commode assembly 10 is to accommodate a pet animal. This will be made clear by the following description.

Figures 3, 4:
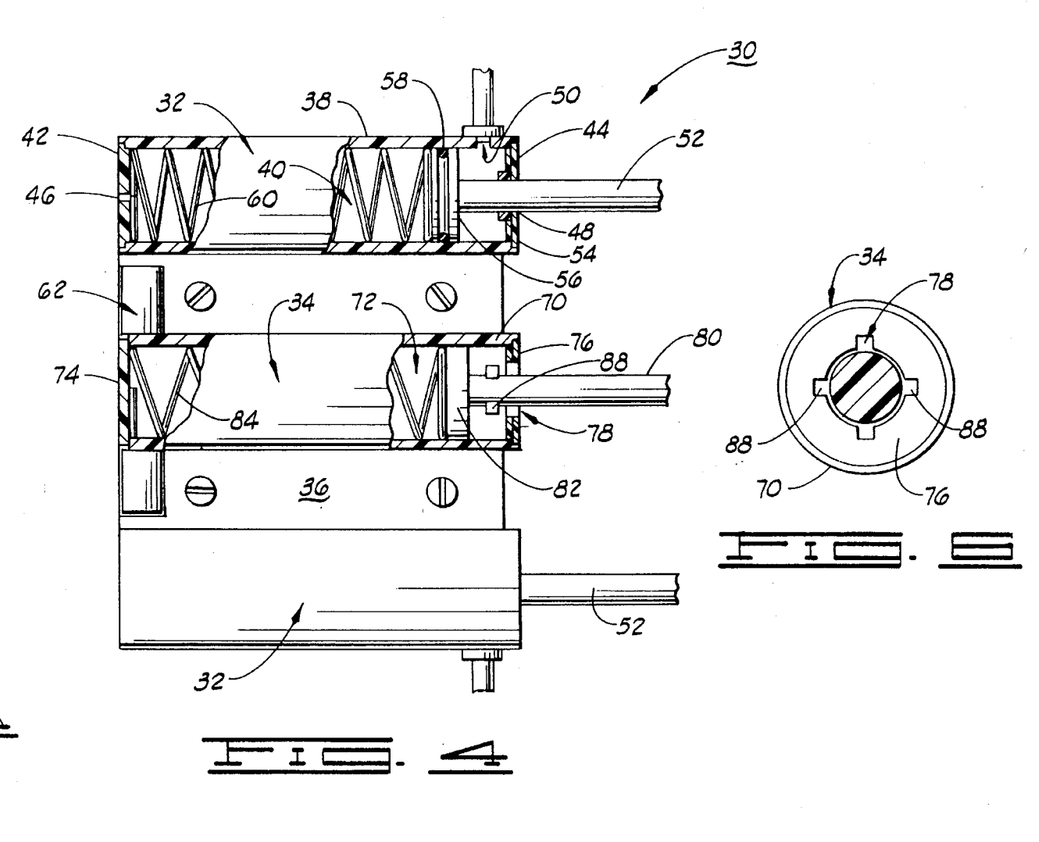
FIG. 4 is a partially cutaway, bottom plan view of one of the cylinder and leg assemblies of the toilet seat assembly of FIG. 1.

The rim member 24 supports multiple sets of cylinder and leg assemblies 30, one of which is shown in FIG. 4. Each cylinder and leg assembly 30 has a pair of parallel fluid cylinders 32 and a rotatable leg member 34 interconnected by a bracket member 36. Each fluid cylinder 32 consists of a cylindrical body 38 having a bore 40, with both ends thereof enclosed by a first cylinder end wall 42 and a second cylinder end wall 44. The bracket member 36 can be integrally formed with the cylindrical bodies 38 as shown.

The first cylinder end wall 42 contains an air bleed port 46 extending through it, allowing air to pass out of and into the bore 40. The second cylinder end wall 44 contains a cylinder shaft aperture 48. The fluid cylinder 32 contains an inlet port 50 extending through the cylindrical body 38, located near the second cylinder end wall 44 end of the fluid cylinder 32. A cylinder shaft 52 passes slidingly through the cylinder shaft aperture 48. A cylinder shaft seal 54 provides a fluid tight seal between the bore 40 and the cylinder shaft aperture 48.

A cylinder piston 56 is affixed to one end of the cylinder shaft 52. The cylinder piston 56 contains a bore seal 58 which provides a fluid tight seal between the cylinder piston 56 and the second cylinder end wall 44. A compressed cylinder spring 60 is disposed in the bore 40 between the cylinder piston 56 and the first cylinder end wall 42. The cylinder spring 60 biases the position of the cylinder piston 56 toward the second cylinder end wall 44 of the fluid cylinder 32.

Pressurized fluid entering the bore 40 through the inlet port 50 fills the bore 40 between the cylinder piston 56 and the second cylinder end wall 44. When the fluid pressure is great enough to overcome the opposing forces of the cylinder spring 60 and the frictional forces on the bore seal 58 and the cylinder shaft seal 54, the cylinder piston 56 is displaced in a direction toward the first cylinder end wall 42 end of the fluid cylinder 32.

Figure 4A:
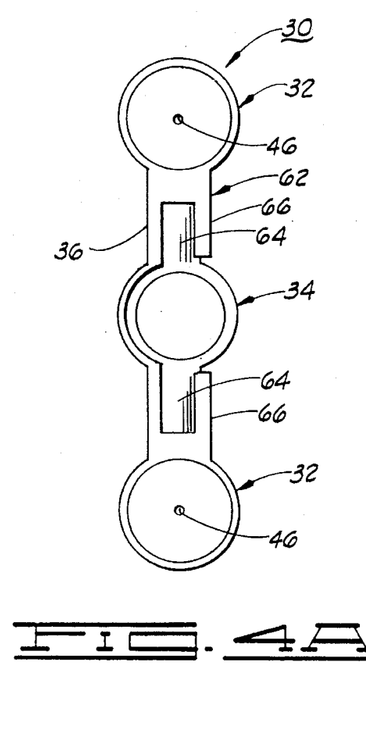
FIG. 4A is an end view thereof.

The leg member 34 is rotatable via a hinge connector 62, the leg member 34 being thereby rotatable between horizontal and vertical position. As shown in FIG. 4A, the hinge connector 62 comprises a pair of pin members 64 integrally formed with the leg member 34 and ear members 66 formed as part of the bracket 36. The ear members 66 are shaped to conform to the shape and size of the pin members 64 and are open on one side (not shown) to permit the pin members 64 to be pressed into the ear members 66 for rotatable support thereby. In the vertical position, the leg members 34 can support the toilet seat assembly 20 on a floor surface as shown in FIG. 2 with sufficient clearance to position a litter pan therebelow.

The leg member 34 has a cylindrical leg body 70 forming a cavity 72 which is enclosed on both ends by a leg end wall 74 and a leg end wall 76. The leg end wall 76 contains a slot shaped leg shaft aperture 78 through which a leg shaft 80 passes slidingly. On one end of the leg shaft 80 is affixed a leg piston 82 which is disposed in the cavity 72, and a leg spring 84 is disposed between the leg end wall 74 and the leg piston 82. The compressed leg spring 84 biases displacement of the leg piston 82 in a direction toward the leg end wall 76.

As shown in FIG. 5, the distal ends of the cylinder shafts 52 of the parallel fluid cylinders 32 and the distal end of the leg shaft 80 of the rotatable leg member 34 are attached to the bottom side of a shelf segment 86. The distal end of the leg shaft 80 is attached to the shelf segment 86 in a conventional detent, press fit socket and must first be disconnected from the shelf segment 86 before rotating the leg member 34 from a horizontal to a vertical orientation. The leg shaft 80 has a pair of tabs 88 that extend from opposite sides of the leg shaft 80 and which are clearingly passed through the slot shaped leg shaft aperture 78 when aligned therewith. As shown in FIG. 6, the leg shaft 80, in its extended position, can be rotated so that the tabs 88 are disaligned with the clearance openings of the leg shaft aperture 78 so as to lock the leg shaft 80 in the extended position as shown in FIG. 2.

An alternative embodiment of the leg member 34 can be achieved by disposing a second pair of tabs (not shown) nearer the distal end of the leg shaft 80 so that such tabs can serve to lock the leg shaft 80 in a retracted position within the cylindrical leg body 70. This permits the leg shaft 80 to be locked in a retracted position so that the leg shaft 80 is in a clearing position relative to the shelf segment 86 and thusly does not exert any forceful interaction therewith.

Returning to FIG. 5, the shelf segment 86 slidingly moves radially within a notch 90 in the rim member 24. The radial location of the shelf segment 86 is controlled by the action of the fluid cylinders 32 of the cylinder and leg assembly 30 disposed about the rim member 24. At low fluid pressure, the cylinder pistons 56 are biased outwardly via the cylinder springs 60 to protract the shelf segment 86 radially inward relative to the central aperture 28 of the toilet bowl 12 as shown.

With reference to FIG. 3 once again, it will be noted that four of the cylinder and leg assemblies 30 are disposed about the rim member 24 such that pairs of the cylinder and leg assemblies 30 are in spaced apart and oppositely facing relationship to each other across the central aperture 28. Each such cylinder and leg assembly 30 has the shelf segment 86 associated therewith, and the four shelf segments 86 meet in the protracted position of the cylinder and leg assemblies 30 as shown to partially restrict the central aperture 28.

The protracted orientation of the shelf segments 86 is also depicted in FIG. 5. In the orientation of the shelf segments 86 shown in FIG. 5, the shelf segments overlap each other at the abutting edges, and can be made to interlock at their sides, if necessary, to provide sufficient strength for a rigid and secure platform to support a pet animal, such as a cat. The shelf segments 86 preferably have a top surface texture that simulates the feel of litter, that is, it is desirable that the top surfaces of the shelf segments 86 are provided with a somewhat roughened surface.

When a human sits on the cushion, the weight thereof causes, in a manner described hereinbelow, an increase in fluid pressure to the cylinder and leg assemblies 30. As the fluid pressure is increased on the cylinder pistons 56 of the cylinder and leg assemblies 30, the cylinder pistons 56 are caused to retract, and this causes the shelf segments 86 to move radially toward the rim member 24. At high fluid pressure, the shelf segments 86 are retracted within the rim member 24, and the central aperture 28 becomes fully exposed as defined by the oval shape of the rim member 24 and cushion 26.

Figure 7:
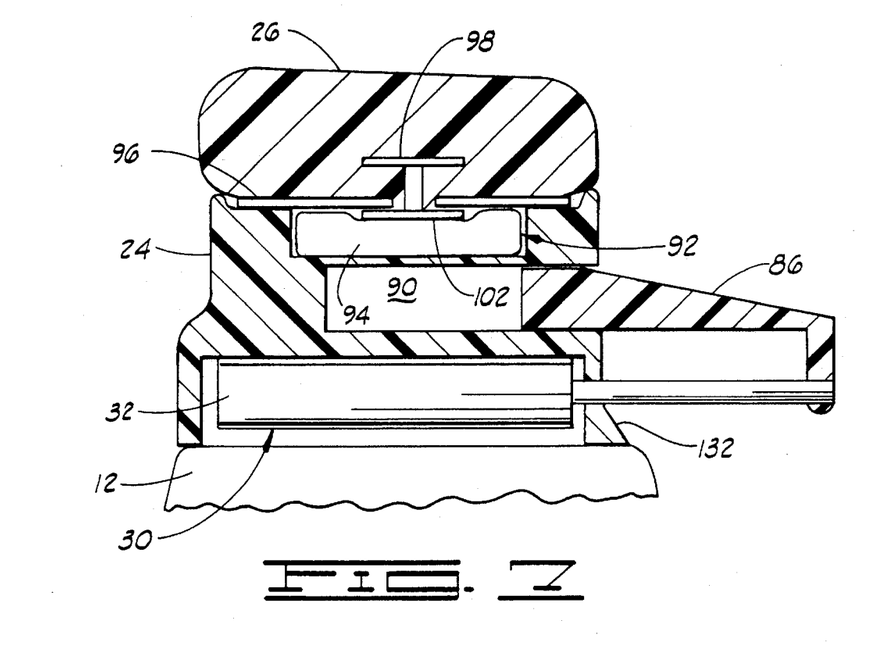
FIG. 7 is a sectional view in elevation along 7—7 in FIG. 3.

Turning now to FIG. 7, a sectional view of the rim member 24 and cushion 26 taken along line 7—7 in FIG. 3 is shown. Disposed in a pair of cavities 92 in the upper surface of the rim member 24, a pair of compressible fluid reservoirs 94 serve to provide pressurized fluid to the fluid cylinders 32 of the cylinder and leg assemblies 30. Any suitable gas or liquid can be used as the fluid. One such cavity 92 and fluid reservoir 94 are shown in FIG. 7; the other cavity 92 and fluid reservoirs 94 are disposed in the rim member 24 directly across the central aperture 28 in opposing fashion thereto. These fluid reservoirs can be constructed from any suitable plastic or elastomeric material which is fluid impermeable and easily deformed.

Figure 8:
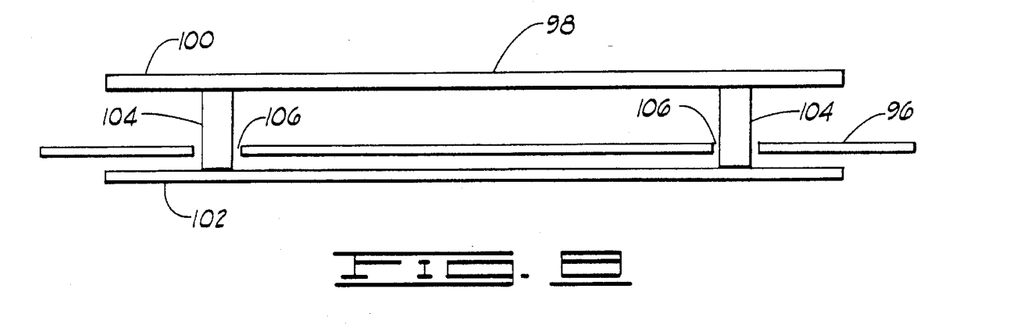
FIG. 8 is an elevational, partially cutaway view of the plunger member and plunger guide plate of the toilet seat assembly of FIG. 3.

Disposed over each cavity 92 is a plunger guide plate 96, located in pressing engagement with each of the fluid reservoirs 94 is a plunger member 98. FIG. 8 shows the relationship of the plunger member 98 and the plunger guide plate 96. Each plunger member 98 has an upper planar member 100 and a lower planar member 102, and a pair of spacer members 104 extend therebetween, passing between apertures 106 in the plunger guide plate 96. The benefit of having the plunger member 98 constructed with the pair of spacer members 104 is that weight is required above these spacer members 104 simultaneously to move the plunger member 98 downwardly. If pressure is applied above only one of the spacer members 104, frictional forces will retard downward movement of the plunger member 98. The required pressure points may be made sufficiently far apart to ensure that an animal jumping up on, or walking on the cushion 26 will not impart significant compression to the fluid reservoirs 94.

As shown in FIG. 7, each plunger member 98 has its upper planar member 100 disposed within the flexible cushion 26 such as by molding the plunger member 98 to be partially embedded therein. The lower planar member 102 of each plunger member 98 is disposed to rest upon the top of the fluid reservoirs 94 disposed therebelow. In this configuration, the weight of a person sitting on the cushion 26 will cause the cushion 26 to compress, deforming downwardly such that the plunger members 98 are caused to compress the pair of fluid reservoirs 94 on each side of the rim member 24. The purpose of this is to direct pressurized fluid to the cylinder and leg assemblies 30 in the manner to be described below, and the plunger guide plates 96 serve to maintain the plunger members 98 substantially in a horizontally extending disposition as the cushion 26 is compressed, thereby assuring uniform compression of the underlying fluid reservoirs 94.

Figure 9:
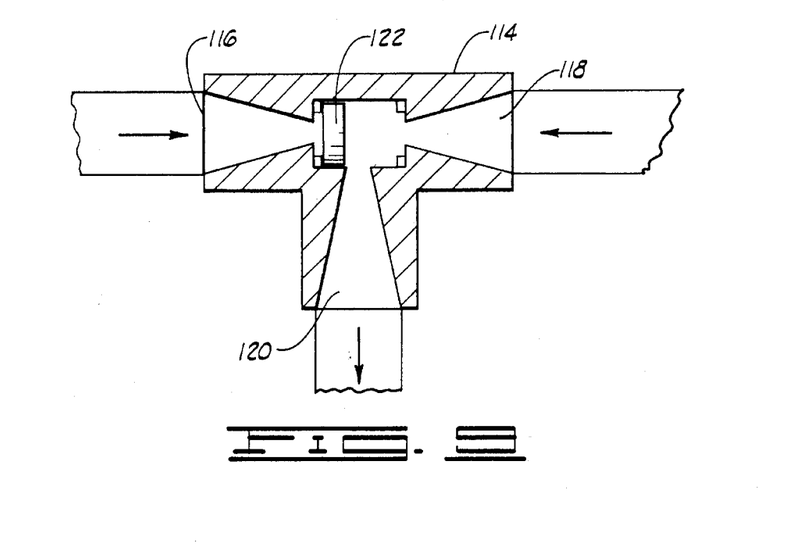
FIG. 9 shows a semi-diagrammatical, partially cutaway view of a shuttle valve of the toilet seat assembly of FIG. 3.

Referring to FIG. 3, compression of the fluid reservoir 94 causes high pressure fluid to be sent from the fluid reservoirs 94 to a tubing assembly 110 which comprises connecting tubing 112 and a pair of shuttle valves 114. One of the shuttle valves 114 is shown in FIG. 9 and has a first inlet port 116, a second inlet port 118 and an outlet port 120 (fluid direction is indicated by the arrow indicia). The shuttle valve 114 has an internal shuttle 122 that is shown in a sealing position relative to the first inlet port 116, and conventionally, is shifted by pressure differential to a position that seals the second inlet port 118 and thereby opens the first inlet port 116. Thus, fluid pressure to either the first or second inlet ports 116, 118 will pass such pressurized fluid to the outlet port 120.

As shown in FIG. 3, the outlet ports 120 of the shuttle valves 114 are connected in parallel to the inlet ports 50 of the cylinder and leg assemblies 30 while connecting outlet ports (not shown) of the fluid reservoir 94 in parallel to the first inlet ports 116 of the shuttle valves 114. Thus the shuttle valves 114 permit passage of the high pressure fluid (emitting from the fluid reservoirs 94 when compressed by the weight of a human user on the cushion 26) through the tubing 112, through the first inlet port 116 to the outlet port 120, while sealing leakage of the high pressure fluid to the second inlet port 118.

Connected to the second inlet ports 118 of the shuttle valves 114 via the connecting tubing 112, in parallel, is a foot reservoir 124. Similar to the fluid reservoirs 94, the foot reservoir 124 is constructed of a compressible, non-permeable plastic or elastomeric material. Containing a quantity of the same fluid in the fluid reservoirs 94, the foot reservoir 124 is disposable on a floor surface for easy access and depression by the foot of a human user of the commode assembly 10. When so depressed by foot pressure, fluid pressure passes to the second inlet ports 118, shifting the internal shuttles 122 to seal the first inlet ports 116, causing fluid pressure to pass through the outlet ports 120 of the shuttle valves 114.

Thus when the fluid reservoirs 94 are compressed (by the weight of a human uses on the cushion 26), high pressure fluid is transmitted therefrom through the shuttle valves 114 via the tubing assembly 110 to the cylinder and leg assemblies 30, thereby effecting the retraction of the shelf segments 86 which fully opens the central aperture or opening 28. When the human user arises, the compression of the fluid reservoirs 94 is relieved, and the cylinder and leg assemblies 30, having the pressure released thereon, extend the shelf segments 86 to assume the protracted position depicted in FIGS. 3 and 5.

On the other hand, should the human user desire to open the central aperture 28 while standing at the commode assembly 10, foot pressure on the foot reservoir 124 also effects opening thereof by passing pressurized fluid through the shuttle valves 114 to effect pressurization of the cylinder and leg assemblies 30 to retract the shelf segments 86 so long as such foot pressure is maintained. A two position valve 126 is disposed in the tubing 112 as shown in FIG. 1, and with foot pressure on the foot reservoir 124, the human user can move the valve 126 from its open position to its closed position, thereby maintaining fluid pressure on the cylinder and leg assemblies 30 while removing foot pressure from the foot reservoir 124. This serves to keep the shelf segments 86 in their retracted mode until the valve 126 is opened.

As shown in FIG. 3, the tubing assembly 110 and the shuttle valves 114 are preferably disposed within a cavity or channels in the underside of the rim member 24, or alternately, molded within cavities of the rim member 24 when formed.

Returning to FIG. 5, shown therein is a training tray 130 which is supported on the rim member 24. The training tray 130 is used as an aid in training a pet animal in the proper use of the commode assembly 10, and the training method suggested herein will be described in detail hereinbelow. First, however, it will be necessary to describe the training tray 130 and its use with the toilet seat assembly 20.

The rim member 24 has a support ridge 132 which extends therefrom and about the central aperture or opening 28 in the toilet bowl 12 as shown. This support ridge 132 is dimensionally established, as is the training tray 130, such that the training tray 130 is supportable thereon in the manner depicted.

Figure 10:
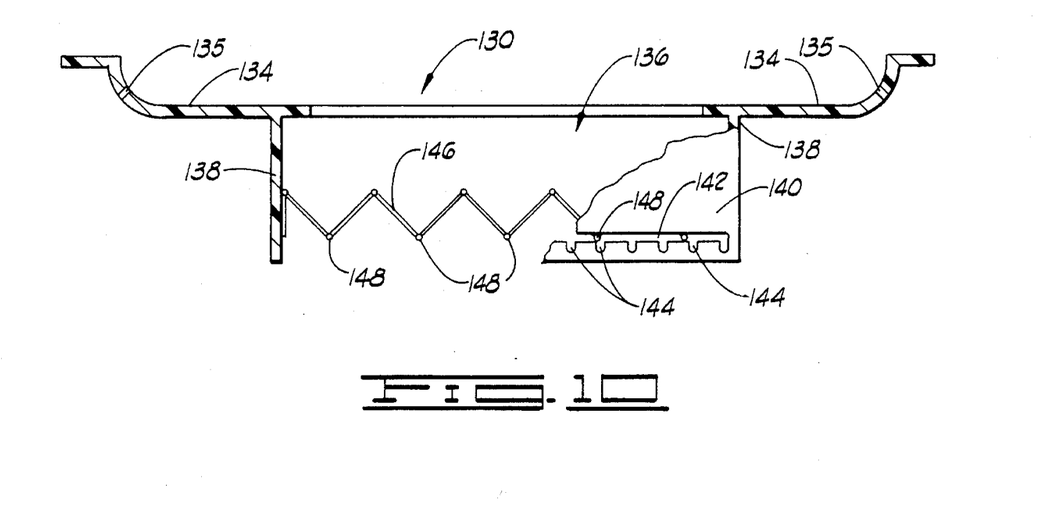
FIG. 10 shows a partially cutaway, side elevational view of a training tray which is used in conjunction with the toilet seat assembly of FIG. 3.

FIG. 10 is a view of the training tray 130 which is a box like structure having a bottom which can be opened in stages, which, as will be made more clear below, assists in training a pet animal user of the toilet seat assembly 20 to become acquainted with the water below in the toilet bowl 12. The training tray 130 consists of a bowed top member 134 which forms a central aperture 136, the top member 134 having a plurality of apertures 135 which are useful for a purpose to be discussed hereinbelow. Extending downwardly from underneath the top member 134 are side members 138 and 140 which form a box like structure open at both top and bottom. The side members 140 have parallel slots 142, each of such slots 142 having multiple detents 144 as shown.

Attached to the inner surface of one on the side members 138, such as by adhesive or thermal bonding, is a folding shelf 146 which is accordion shaped to permit the folding shelf 146 to collapse as it is moved from a closed position (in which the folding shelf 146 closes off the open bottom of the training tray 132) to an open position (in which the folding shelf 146 is positioned to substantially open the bottom of the training tray 130).

The folding shelf 146 has a plurality of tabs 148 extending from each side thereof and which are formed as an integral part of the folding shelf 146 at each of the folds thereof. The tabs 148 of the folding shelf 146 are retained in the parallel slots 142 and permit the folding shelf to be folded or extended therealong to establish the amount of exposure through the central aperture 136. When the desired amount of exposure is achieved, the folding shelf 146 is locked into place by pressing the tabs 148 downwardly into the selected detents 144.

As will now become clear by turning to a description of the training method, the training tray 130 is placed on the support ridge of the rim member 24 for use by a pet animal. It is suggested that the toilet seat assembly 20 be placed on the floor to replace the pet animal's litter box at the location where the pet animal's litter box has normally been situated. This is achieved by removing the toilet seat assembly 20 from the toilet bowl 12, extending and rotating the leg members 34 as described hereinabove and placing the toilet seat assembly 20 as depicted in FIG. 2. The shelf segments 86 are retracted by compressing the foot reservoir 124 and locking these in their retracted mode by closing the valve 126.

The training tray 130 is closed (by extending the folding shelf 146 in its closed position) and placed on the rim member 24. Litter is now placed on the folding shelf 146 and on the bowed member 134. It is advisable to use a portion of the used litter from the prior litter box together with some new litter. The prior litter box should be removed so as to leave the training tray 130 as the only one available to the pet animal. The pet animal will now use the litter in the training tray 130 and should be allowed to use it in this familiar location for a few days.

The next step in the training is to move the toilet seat assembly 20 to a location immediately adjacent to the toilet bowl 12. At this stage, the shelf segments 86 continue to be in the retracted position. This step in the training affords the pet animal the use of its litter box (by now the training tray 130) in a location in near proximity to the toilet bowl 12, and the pet animal should be allowed a few days to become accustomed to having its litter box in this new location.

Once the pet animal has become accustomed to using its litter box (the training tray 130) next to the toilet bowl 12, the next step is to protract the shelf segments 86 by opening the valve 126, and to permit the pet animal to get used to using the toilet seat assembly 20 in this profile. The protracted shelf segments 86 reduce the size of the pet animal's litter box to about the dimensions of the folding shelf 146 in its closed position.

Once the pet has become accustomed to use of the litter in the training tray (that is, sufficient time has passed in which the toilet seat assembly 20 has become identified as the pet's litter box) in this profile, the leg members 34 are folded up and the toilet seat assembly 20 is reattached to the toilet bowl 12, replacing the conventional seat. The training tray 130, with the old litter, remains on the rim member 24.

The shelf segments 86 and the training tray 130 are dimensioned such that the shelf segments 86 provide a supporting surface immediately surrounding the aperture or opening 136 of the training tray 130 so that the litter on the folding shelf 146 is visible between and below the shelf segments 86.

Once the pet animal has used the litter in the training tray 130 in its position over the toilet bowl 12, the folding shelf 146 of the training tray 130 is opened just enough to somewhat expose the water in the toilet bowl 12 below. The pet will continue to use the litter but will now become accustomed to seeing water below. The folding shelf 146 can then be opened gradually over time so that less and less of the litter is available and more of the water is in view as the pet continues to use the litter in the training tray 130 over the toilet bowl 12.

As the water below the training tray 130 becomes familiar to the animal, and the amount of litter available to the animal becomes less, there will be a point in time when the training tray 130 can be removed. If, at this point, the pet continues to use the toilet seat assembly 20 in the manner before removed, the training tray 130 can be permanently removed. Should there be any hesitancy by the pet in such continued usage, the cycle of litter training on the toilet seat assembly 20 can be repeated as necessary. However, this will be rare, as pets will usually quickly adapt to the usage of the toilet seat assembly 20 with the training tray 130 removed, perching upon the protracted shelf segments 86 while eliminating through the reduced central aperture or opening 28 into the water contained in the toilet bowl 12.

Once the pet animal has been trained to use the commode assembly 10 without the training tray 130 in place, the commode assembly 10 is readily usable by both humans and pet animals in the manner and for the reasons described hereinabove.

Figure 11:
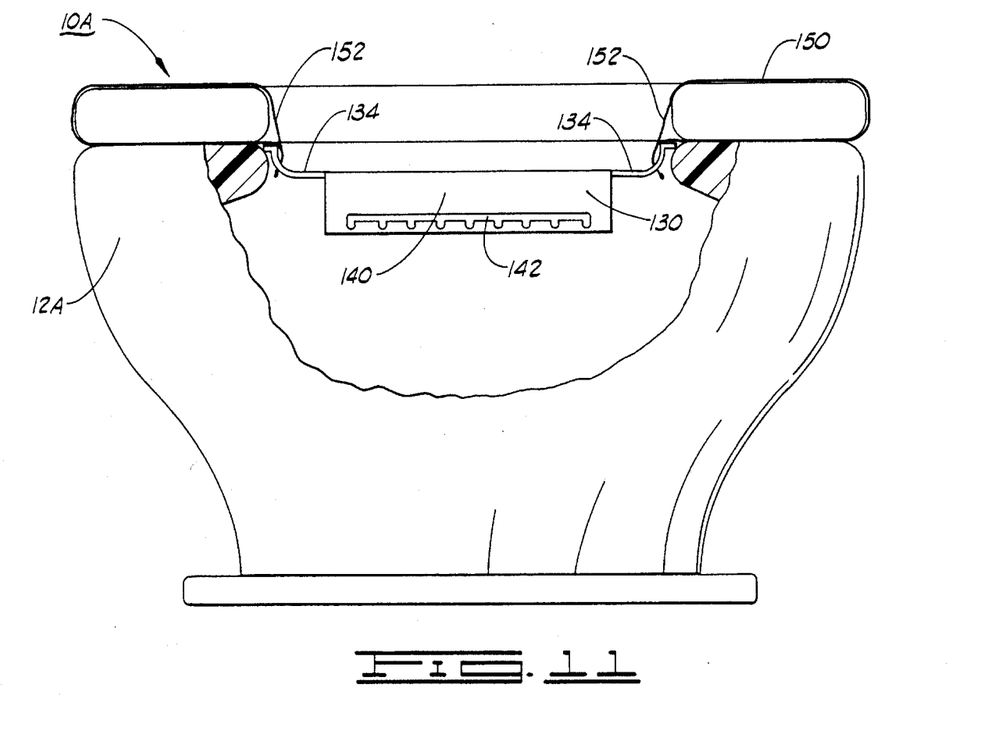
FIG. 11 shows another commode assembly in which the training tray is affixed to a conventional toilet seat.

FIG. 11

The training tray 130 can also be used by itself to train a pet animal to eliminate in a conventional toilet bowl FIG. 11 depicts a commode assembly 10A which has the toilet bowl 12A and a water closet (not shown) connected thereto in a conventional manner. The commode assembly 10A has a conventional toilet seat 150 which is an oval ring shaped member supported on the toilet bowl 12 for the support of either a human or a pet animal user of the commode assembly 10A. The toilet seat 150 may have a lid (not shown) pivotally connected thereto in a conventional manner.

As shown in FIG. 11, the training tray 130 can be secured to the toilet seat 150 by way of string members 152 which are passed through the apertures 135. Thus, as demonstrated here, the training tray 130 can be used with a conventional commode assembly 10A to train a pet animal, such as a household cat, to use the toilet bowl 12A in lieu of a litter box.

The training tray of a pet animal using the training tray 130 in the manner depicted in FIG. 11 is similar to that described hereinabove. Since the toilet seat 150 affixed to the toilet bowl 12 does not have retractable support legs like that of the toilet seat assembly 20 described above, the starting point in the training is to place the training tray 130 on the floor to replace the pet animal's litter box at the location where its regular litter box has normally been situated.

The training tray 130 is closed by extending the folding shelf 146 in its closed position. Litter is placed on the folding shelf 146 and on the bowed member 134. It is advisable to use a portion of the used litter from the prior litter box together with some new litter. The prior litter box should be removed so as to leave the training tray 130 as the only one available to the pet animal. The pet animal will now use the litter in the training tray 130 and should be allowed to use it in this familiar location for a few days.

The next step in the training is to move the training tray 130 to a location immediately adjacent the toilet bowl 12. This step in the training affords the pet animal the use of its litter box (now the training tray 130) in a location in near proximity to the toilet bowl 12, and the pet animal should be allowed a few days to become accustomed to having its litter box in this new location.

Once the pet animal has become accustomed to using its litter box (the training tray 130) next to the toilet bowl 12, the next step is to affix the training tray 130 to the toilet seat 150 as described above using the string members 152. Once the pet animal has become accustomed to using the litter in the training tray 130 in its position over the toilet bowl 12, the folding shelf 146 of the training tray 130 is opened just enough to somewhat expose the water in the toilet bowl 12 below. The pet will continue to use the litter but will now become accustomed to seeing water below. The folding shelf 14 can then be opened gradually over time so that less and less of the litter is available and more of the water is in view as the pet continues to use the litter in the training tray 130 over the toilet bowl 12.

As the water below the training tray 130 becomes familiar to the animal, and the amount of litter available becomes less, there will be a point in time when the training tray 130 can be removed. If, at this point, the pet continues to use the toilet seat assembly 20 in the manner before removal, the training tray 130 can be permanently removed. Should there be any hesitancy by the pet in such continued usage, the cycle of litter training on the training tray 130 can be repeated as necessary. However, this will be rare, as pets will usually quickly adapt to the usage of the training tray 130 removed, perching upon the toilet seat 150 while eliminating into the water contained in the toilet bowl 12.

Figures 12, 12A:
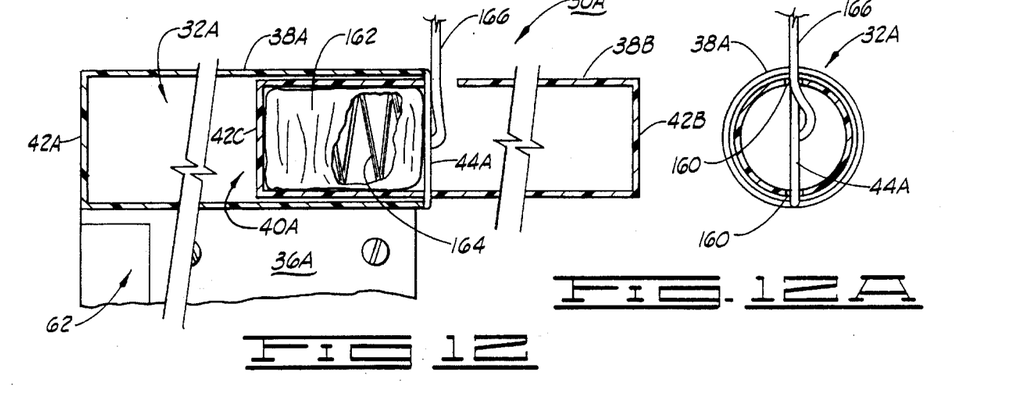
FIG. 12 is a partially cutaway, bottom plan view of a portion of another embodiment of a cylinder and leg assembly.
FIG. 12A is an end view of a portion thereof.

FIGS, 12–12A

Another embodiment of a cylinder and leg assembly 30A is shown in FIG. 12. The cylinder and leg assembly 30A is identical in function to the cylinder and leg assemblies 30 described hereinabove (and as shown in FIGS. 4–5), so the same numbers will appropriate letter suffixes will be used to indicate such identity of structure.

As described above, the rim member 24 supports multiple sets of the cylinder and leg assemblies 30, and in like manner, in the alternate construction described herein, the rim member 24 can support multiple sets of the cylinder and leg assemblies 30A, one of which is partially shown in FIG. 12. Each cylinder and leg assembly 30A has a pair of parallel fluid cylinders 32A and a rotatable leg member 34 (not shown in FIG. 12) connected by a bracket member 36A. The leg member 34 is rotatable via a hinge connector 62. Each fluid cylinder 32A consists of an outer cylindrical body 38A having a bore 40A, one end of the bore 40A enclosed by an end wall 42A as shown. The other end of the outer cylindrical body 38A is partially closed by an end bar 44A (more clearly shown in FIG. 12A).

An inner cylindrical body 38B slides within the outer cylindrical body 38A so that a portion thereof is disposed within the bore 40A. The extending end of the inner cylindrical body 38B is closed by an end wall 42B. The end of the inner cylindrical body 38B within the bore 40A is closed via an end wall 42C. The inner cylindrical body 38B has a pair of slots 160 on opposite sides thereof to provide clearance for the end bar 44A as the inner cylindrical body 38B slides within the outer cylindrical body 38A.

An expandable fluid reservoir 162 is disposed within the inner cylindrical body 38B at the junction of the outer cylindrical body 38A and the inner cylindrical body 38B as shown. The fluid reservoir 162 is affixed to the end wall 42C of the inner cylindrical body 38B, and to the end bar 44A of the outer cylindrical body 38A, such as by an adhesive bonding. Disposed within the fluid reservoir 162 is a spring 164. A compressed fluid tube 166 passes through one of the slots 160 in the inner cylindrical body 38B and is preferably adhesively bonded to the end bar 44A. The compressed fluid tube 166 passes through an aperture in the fluid reservoir 162 and is bonded thereto as it terminates inside the fluid reservoir 162. This is best shown in FIG. 12A. It should be noted that the outer cylindrical body 38A and the inner cylindrical body 38B are shown as being transparent in order to show the components described, and preferably, are made of a rigid polymeric material.

In like manner to that of the cylinder shafts 52 of the parallel fluid cylinders 32 of the cylinder and leg assemblies 30, the distal or extending ends of the inner cylindrical bodies 38B (having the end walls 42B) are attached to the bottom side of the shelf segments 86, such as by adhesive bonding or by a compression socket fit. The spring 164 biases the inner cylindrical body 38B toward its protracted mode in the absence of compressed fluid in the tube 166; the tube 166 is connected to the fluid reservoirs 94 and the foot reservoir 124 via the connecting tubing 112. The fluid reservoir 162 is preferably formed from an elastomeric material, one which can expand and contract without great resistance. When high pressure fluid enters the fluid reservoir 162 via the tube 166, the fluid reservoir 162 expands. This expansion communicates linear motion to the end wall 42C, which thus retracts the inner cylindrical body 38B into the outer cylindrical body 38A; this causes the retraction of the shelf segments 86 in the same manner and for the same reason discussed hereinabove.

Figure 13:
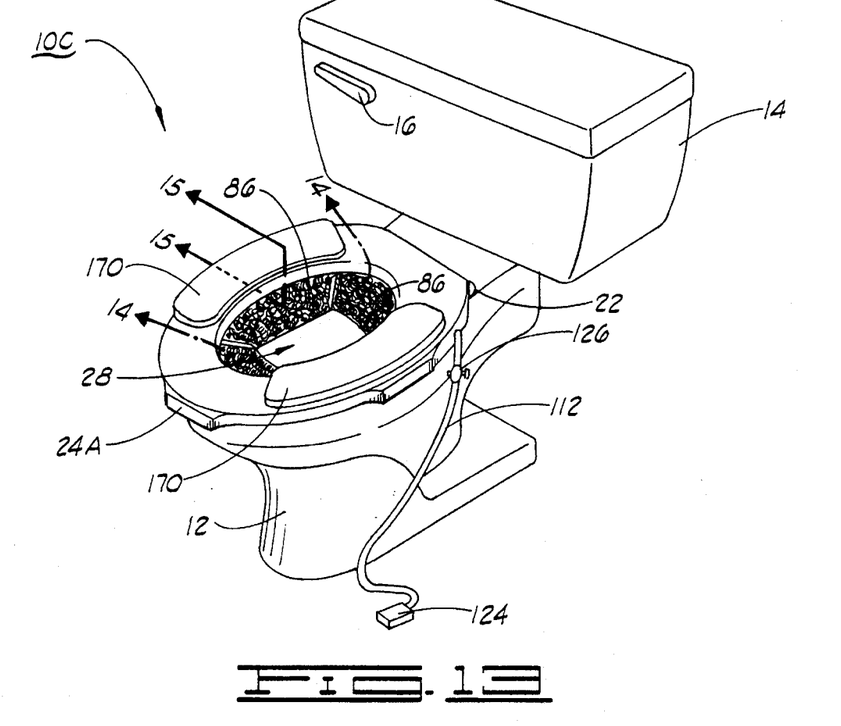
FIG. 13 is a perspective view of another commode assembly also constructed in accordance with the present invention.
Figure 14:
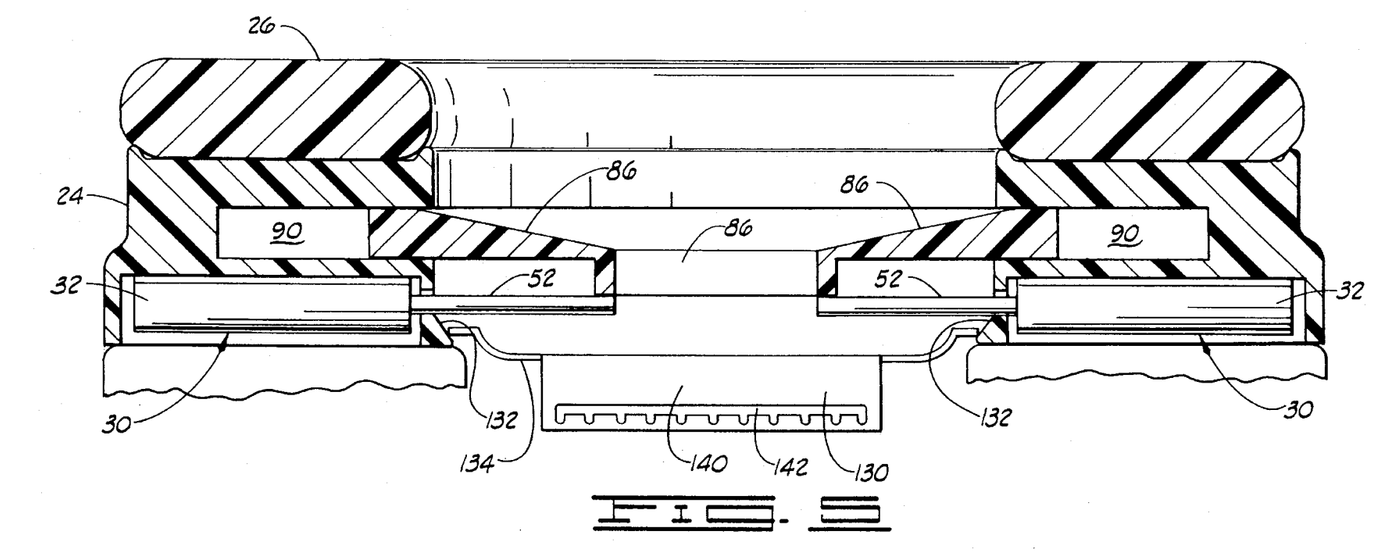
FIG. 14 is a partial view of the toilet seat assembly of, and taken at 14—14 in, FIG. 13.
Figure 15:
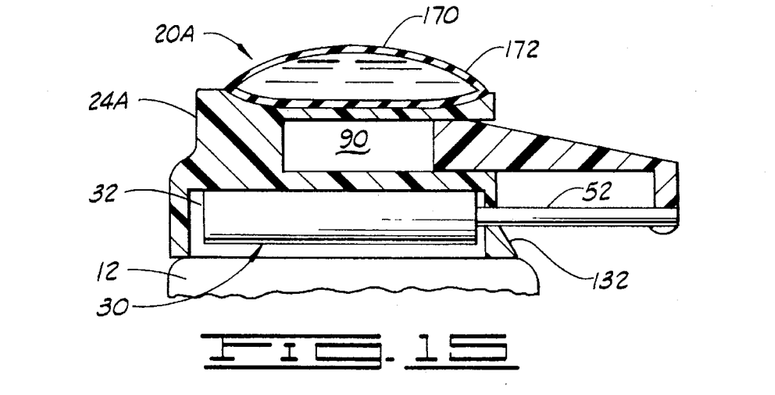
FIG. 15 is a cross sectional view of the toilet seat assembly of, and taken at 15—15 in, FIG. 13.

FIGS. 13–15

Shown in FIG. 13 is a commode assembly 10C, which is another embodiment of the present invention. The commode assembly 10C is identical in function to the commode assembly 10 described hereinabove, so the same numbers will be used, with appropriate letter suffixes as necessary to indicate such identity of structure.

The commode assembly 10C has a toilet bowl 12 and a water closet 14 connected thereto in a conventional manner. The water closet 14 has a flushing lever 16 and contains conventional internal structure (not shown) that, connected to a water supply, provides flushing water to the toilet bowl 12 upon depressing the flushing lever 16. These portions of the commode assembly 10C are identical to the commode assembly 10 described above.

The commode assembly 10C has a toilet seat assembly 20A that is supported on the toilet bowl 12 as shown in FIG. 1. The toilet seat assembly 20A is attached to the toilet bowl 12 by a hinge connection 22 having bolts (not shown) which extend through appropriately located apertures in the toilet bowl 12 in a conventional manner so that the toilet seat assembly 20A will fit common mounting apertures without modification.

The toilet seat assembly 20A consists of an oval ring shaped rim member 24A having integrally formed cushions 170 which serves the same function to hat of the cushion 26 of the commode assembly 10 above, and will be described below. With this exception, the structure of the rim member 24A is the same as the rim member 24 described above.

One of the cushions 170 is shown in FIG. 14 which also shows such connected to the connecting tubing 112. Each cushion 170 serves as a fluid reservoir which functions identically to that of the fluid reservoirs 94 described hereinabove. That is, each of the cushions 170 is constructed from a plastic or elastomeric material and has a hollow interior which is filled with an incompressible liquid or fluid.

FIG. 15 shows the toilet seat assembly 20A in cross sectional detail, with the cylinder and leg assemblies 30 supported on the underside of the rim member 24A. The cushion members 170 are integrally formed with the rim member 24A, and since the cushion member 170 serve as compressible fluid reservoirs in fluid communication with the connecting tube 112, the overall height dimension of the toilet seat assembly 20A is less than that of the above described toilet seat assembly 20; this is achieved due to the elimination of the separate fluid reservoirs 94, making the appearance of the toilet seat assembly 20A more closely approaching a conventional toilet seat cover.

Preferably, the seat cushion 1070 has an upper surface 172 which has a greater thickness dimension, such as by multiple layer vulcanizing, so that this tough upper surface 172 will be resistant to damage from the eh claws of a cat or other pet animals.

The weight of a person sitting on the cushions 170, either together, or on either one of same, will cause the cushions 170 to compress, deforming downwardly such that pressurized fluid is provided, via the connecting tubing 112, to the cylinder and leg assemblies 30 in the manner described above for the toilet seat assembly 20, thereby effecting the retraction of the shelf segments 86 which fully opens the central opening 28. When the human arises, the compression of the fluid reservoirs of the cushions 170 is relieved, and the cylinder and leg assemblies 30, having the pressure released thereon, extend the shelf assemblies 86 to assume their retracted position.

It will be clear that the present invention is well adapted to carry out the objects and to attain the advantages mentioned, as well as those inherent therein. While presently preferred embodiments of the invention have been described for the purposes of this disclosure, numerous changes can be made which will readily suggest themselves to those skilled in the art and which are encompassed within the spirit of the invention disclosed and as defined in the appended claims.

What is claimed is:

1. A commode assembly connectable to a sewage drain, comprising:

a toilet bowl in fluid communication with the drain;

water closet means for storing a flushing fluid and for providing flushing fluid to the toilet bowl upon demand;

toilet seat means supportable on the toilet bowl for providing a variable sized central aperture to accommodate human usage in one mode and to accommodate a pet animal usage in another mode, the toilet seat means comprising:

a rim member supportable by the toilet bowl and forming the central aperture above the toilet bowl; and shelf means supported by the rim member for selectively reducing the central aperture and opening the central aperture, the shelf means comprising a plurality of shelf segments positionable in a protracted mode to partially close the central aperture and thereby provide a platform capable of supporting a pet animal, and positionable in a retracted mode to open the central aperture for human usage; and a cushion member supported on the rim member; and wherein the toilet seat means comprises:

pressure means responsive to the weight of a human on the cushion member for positioning the shelf segments in the retracted mode and for positioning the shelf segments in the protracted mode in response to removal of the human weight, the pressure means comprising cylinder and leg means having pressure operable fluid cylinders connected to the shelf segments and which are protractable and retractable thereby, and the pressure means further comprising:

fluid reservoir means in fluid communication with the cylinder and leg means for providing pressurized fluid to the cylinder and leg means, the fluid reservoir means comprising:

at least one first compressible reservoir member supported by the rim member and disposed for compression response to the weight of a human sitting on the cushion member so that fluid in each first compressible reservoir member is pressure communicated to the pressure operable fluid cylinders that are connected to the shelf segments.

2. The commode assembly of claim 1 wherein the cylinder and leg means further comprises:

leg means for selectively supporting the rim member on a selected surface separate from the toilet bowl, the leg means comprising a plurality of legs rotatably connected to the rim member.

3. The commode assembly of claim 2 wherein the fluid reservoir means further comprises:

a second compressible reservoir member supportable on the selected surface and manually compressible so that fluid in the second compressible reservoir member is pressure communicated to the pressure operable fluid cylinders that are connected to the shelf segments; and control means for directing fluid pressure communication from the first actuated one of the first and second compressible reservoir members to the fluid cylinders.

4. The commode assembly of claim 3 wherein the control means comprises:

a shuttle valve having inlet ports in fluid communication with the first and second compressible fluid reservoir members and having an outlet port in fluid communication to the fluid cylinders.

5. The commode assembly of claim 4 wherein the pressure means further comprises:

a plunger member supported by the cushion member, the plunger member having a lower portion disposed in pressing engagement with at least one first compressible fluid reservoir member and caused to compress same when the cushion member is compressed by the weight of a human user; and guide means for maintaining substantially uniform compressive force on at least one first compressible fluid reservoir member during compression thereof by the plunger member.

6. The commode assembly of claim 5 wherein the pressure means further comprises:

a valve disposed between the second compressible fluid reservoir member and the fluid cylinders, the valve having an on position whereby fluid pressure is communicable to the fluid cylinders and having a shut off mode whereby fluid pressure communication is prevented to the fluid cylinders.

7. The commode assembly of claim 6 wherein the rim member has a support ridge extending about the central aperture and the commode assembly further comprising:

a plurality of training shelf members removably supported by the support ridge, the training shelf members reducing the size of the central aperture a selected amount during the training of a pet animal.

8. In a commode assembly having a toilet bowl and a water closet in fluid communication therewith so that flushing fluid is provided to the toilet bowl for flushing upon demand to a sewage drain, the improvement comprising:

toilet seat means supportable on the toilet bowl for providing a variable sized central aperture to accommodate human usage in one mode and to accommodate pet animal usage in another mode, the toilet seat means comprising:

a rim member supportable by the toilet bowl and forming the central aperture above the toilet bowl;

shelf means supported by the rim member for selectively reducing the central aperture and opening the central aperture, the shelf means comprising a plurality of shelf segments positionable in a protracted mode to partially close the central aperture and thereby provide a platform capable of supporting a pet animal, and positionable in a retracted mode to open the central aperture for human usage;

a cushion member supported by the rim member; and wherein the toilet seat means further comprises:

pressure means responsive to the weight of a human on the cushion member for positioning the shelf segments in the retracted mode and for positioning the shelf segments in the retracted mode in response to removal of the human weight, the pressure means comprising cylinder and leg means having pressure operable fluid cylinders connected to the shelf segments and which are protractable and retractable thereby, and wherein the pressure means further comprises:

fluid reservoir means in fluid communication with the cylinder and leg means for providing pressurized fluid to the cylinder and leg means, the fluid reservoir means comprising:

a first compressible reservoir member supported by the rim member and disposed for compression response to the weight of a human sitting on the cushion member so that fluid in the first compressible reservoir member is pressure communicated to the pressure operable fluid cylinders that are connected to the shelf segments.

9. The improvement of claim 8 wherein the cylinder and leg means further comprises:

leg means for selectively supporting the rim member on a selected surface separate from the toilet bowl, the leg means comprising a plurality of legs rotatably connected to the rim member.

10. The improvement of claim 9 wherein the fluid reservoir means further comprises:

a second compressible reservoir member supportable on the selected surface and manually compressible so that fluid in the second compressible reservoir member is pressure communicated to the pressure operable fluid cylinders that are connected to the shelf segments; and control means for directing fluid pressure communication from the first actuated one of the first and second compressible reservoir members to the fluid cylinders.

11. The improvement of claim 10 wherein the control means comprises:

a shuttle valve having inlet ports in fluid communication with the first and second compressible reservoir members and having an outlet port in fluid communication to the fluid cylinders.

12. The improvement of claim 11 wherein the pressure means further comprises:

a plunger member supported by the cushion member, the plunger member having a lower portion disposed in pressing engagement with the first compressible reservoir member and caused to compress same when the cushion member is compressed by the weight of a human user; and guide means for maintaining substantially uniform compressive force on the first compressible reservoir member during compression thereof by the plunger member.

13. The improvement of claim 12 wherein the pressure means further comprises:

valve disposed between the second compressible reservoir member and the fluid cylinders, the valve having an on position whereby fluid pressure is communicable to the fluid cylinders and having a shut off mode whereby fluid pressure communication is prevented to the fluid cylinders.

14. The improvement of claim 13 wherein the rim member has a support ridge extending about the central aperture and the commode assembly further comprising:

a training tray removably supported by the support ridge when the shelf segments are retracted, the training tray having a central aperture and a folding shelf which is adjustable to selectively close the central aperture of the training tray a selected amount during the training of a pet animal; and means for securing the training tray to the rim member.

15. In a commode assembly having a toilet bowl and a water closet in fluid communication therewith so that flushing fluid is provided to the toilet bowl for flushing upon demand to a sewage drain, the improvement comprising:

toilet seat means supportable on the toilet bowl for providing a variable sized central aperture to accommodate human usage in one mode and to accommodate pet animal usage in another mode, the toilet seat means comprising:

a rim member supported by the toilet bowl and forming the central aperture above the toilet bowl; and shelf means supported by the rim member for selectively reducing the central aperture and opening the central aperture, the shelf means comprising a plurality of shelf segments positionable in a protracted mode to partially close the central aperture and thereby provide a platform capable of supporting the pet animal, and positionable in a retracted mode to open the central aperture for human usage;

cushion and pressure means supported by the rim member and responsive to the weight of a human thereon for positioning the shelf self segments in the retracted mode and for positioning the shelf segments in the protracted mode in response to the removal of the human weight; and wherein the cushion and pressure means comprises cylinder and leg means having pressure operable fluid cylinders connected to the shelf segments and which are protractable and retractable thereby, and wherein the cushion and pressure means further comprises:

fluid reservoir means in fluid communication with the cylinder and leg means for providing pressurized fluid to the cylinder and leg means, the fluid reservoir means comprising at least one first compressible reservoir member disposed for compression response to the weight of a human so that fluid in each first compressible reservoir member is pressure communicated to the pressure operable fluid cylinders that are connected to the shelf segments.

16. The improvement of claim 15 wherein the cylinder and leg means further comprises:

leg means for selectively supporting the rim member on a selected surface separate from the toilet bowl, the leg means comprising a plurality of support legs rotatably connected to the rim member.

17. The improvement of claim 16 wherein the fluid reservoir means further comprises:

a second compressible reservoir member supportable on the selected surface and manually compressible so that fluid in the second compressible reservoir member is pressure communicated to the pressure operable fluid cylinders that are connected to the shelf segments;and control means for directing fluid pressure communication from the first actuated one of the first and second compressible reservoir members to the fluid cylinders.

18. The improvement of claim 17 wherein the control means comprises:

a shuttle valve having inlet ports in fluid communication with the first and second compressible reservoir members, the shuttle valve having an outlet port in fluid communication to the fluid cylinders.

19. The improvement of claim 18 wherein the pressure means further comprises:

a valve disposed between the fluid cylinders and the second compressible reservoir member, the valve having an on position whereby fluid pressure is communicable to the fluid cylinders and having a shut off mode whereby fluid pressure communication is prevented to the fluid cylinders.

* * * * *

UNITED STATES PATENT AND TRADEMARK OFFICE
CERTIFICATE OF CORRECTION

PATENT NO. : 5,458,089
DATED : October 17, 1995
INVENTOR(S) : Jon K. Rymer

It is certified that error appears in the above-indentified patent and that said Letters Patent is hereby corrected as shown below:

```
Column 7, line 10, delete "uses" and substitute therefor
     --user--;

Column 12, line 26, delete "1070" and substitute therefor
     --170--; and

Column 12, line 29, delete "eh".
```

Signed and Sealed this

Thirty-first Day of December, 1996

*Attest:*

BRUCE LEHMAN

*Attesting Officer*      *Commissioner of Patents and Trademarks*